United States Patent [19]

Nakayama et al.

[11] Patent Number: 4,756,294

[45] Date of Patent: Jul. 12, 1988

[54] AIR-FUEL MIXTURE HEATING DEVICE FOR USE WITH ENGINES

[75] Inventors: Hajime Nakayama; Osamu Aoki; Shigetoshi Nishijima; Haruo Horiuchi, all of Saitama; Takuya Sugino, Tokyo, all of Japan

[73] Assignee: Honda Giken Kogyo Kabushiki Kaisha, Tokyo, Japan

[21] Appl. No.: 845,640

[22] Filed: Mar. 28, 1986

[30] Foreign Application Priority Data

Apr. 1, 1985 [JP] Japan .............................. 60-46824[U]
Apr. 1, 1985 [JP] Japan .............................. 60-46825[U]

[51] Int. Cl.$^4$ ........................................... F02M 31/00
[52] U.S. Cl. ..................................... 123/549; 219/205
[58] Field of Search ....................... 123/549, 546, 547; 261/142; 219/205, 206, 207

[56] References Cited

U.S. PATENT DOCUMENTS

| | | | |
|---|---|---|---|
| 4,327,697 | 5/1982 | Wada | 123/549 |
| 4,384,563 | 5/1983 | Siefer | 123/549 |
| 4,387,690 | 6/1983 | Chiavaroli | 123/549 |
| 4,424,787 | 1/1984 | Fitz | 123/549 |
| 4,448,173 | 5/1984 | Abe | 123/549 |
| 4,593,670 | 6/1986 | Nara | 123/549 |

*Primary Examiner*—Ronald B. Cox
*Attorney, Agent, or Firm*—Lyon & Lyon

[57] ABSTRACT

An air-fuel mixture heating device for heating an air-fuel mixture supplied from a carburetor to an intake manifold includes an insulator mounted between the carburetor and the intake manifold and having a first air-fuel mixture passage communicating with the primary air-fuel mixture passage in the carburetor, an electric heater disposed in the first air-fuel mixture passage of the insulator for heating the air-fuel mixture, and a plurality of conductors embedded in the insulator and having portions connected to the electric heater and an electric power supply. The insulator has access holes extending to the portions of the conductors for allowing said portions to be joined to the electric heater therethrough. The access holes are filled up with masses of sealing resin after said portions are joined to the electric heater. The conductors extend on one side of a second air-fuel passage in the insulator which communicates with the secondary air-fuel passage in the carburetor, the conductors having outer ends projecting as terminals out of the insulator laterally of the second air-fuel passage or remotely from the first air-fuel mixture passage.

18 Claims, 5 Drawing Sheets

AIR-FUEL MIXTURE HEATING DEVICE FOR USE WITH ENGINES

The present invention relates to an electric heating device for heating an air-fuel mixture supplied to the combustion chambers of an engine, and more particularly to an air-fuel mixture heating device with an electric heater secured to an insulator mounted between the carburetor and the engine intake manifold.

When starting an automotive internal combustion engine under low temperature conditions as in a cold climate, a sufficient amount of fuel cannot be vaporized satisfactorily by the carburetor since the engine is cold at engine start up and the air drawn into the carburetor is of a low temperature. It has been proposed to heat the air, the fuel, or their mixture prior to delivery thereof to the engine combustion chambers thereby to promote fuel vaporization and mixing of the air and fuel for starting a cold engine quickly and also to both reduce the emission of pollutants from the engine and lower the fuel consumption.

Various air-fuel mixture heating devices are known in the art. One of the prior art-fuel mixture heating devices comprises an electric heating device employing a heater of a positive temperature coefficient (hereinafter referred to as PTC) of resistivity, as disclosed in Japanese Laid-Open Patent Publication No. 53(1978)-59130 (corresponding to U.S. Pat. No. 4,141,327). The PTC heater is made of a ceramic semiconductor which, when a voltage is applied thereto, is heated within a relatively short period of time up to a certain temperature, whereupon the PTC heater is self-regulated in temperature. The PTC heater is therefore optimum for use in an air-fuel mixture heating device which is required to limit its maximum temperature. Generally, the PTC heater is fixed to an insulator disposed to provide thermal insulation between a carburetor and an intake manifold. In operation, the PTC heater is energized to heat the air-fuel mixture passing therethrough for vaporizing the fuel efficiently.

In assembling the PTC heater in the insulator, it is necessary to provide means for supplying electric power to the PTC heater from an external power supply through the insulator. According to the disclosure of the aforesaid publication, the insulator is made up of several insulating layers in mutually overlapping relation, and conductors for supplying electric power to the PTC heater are connected at one end to the PTC heater and disposed between the insulating layers, the other end of the conductors projecting as terminals out of the insulator for connection to insulation-covered leads coupled to the power supply such as a battery.

Where the insulator is composed of such insulating layers, the number of parts required for the heating device assembly is increased, which makes the parts inventory control and assembling process complicated.

Recent years have seen the development of a PTC heater comprising an enclosure of metal and a ceramic heater element housed in the enclosure through which a voltage will be applied to the ceramic heater element. In such a PTC heater, conductors in the form of metal plates for connection to an external power supply are embedded in the insulator and joined to the enclosure of the PTC heater. Thus, the PTC heater is secured to the insulator and can be supplied with electric power once the conductors are joined to the enclosure.

The conductors in the form of metal plates are joined to the PTC heater enclosure normally by riveting for better thermal resistance and simpler assembling procedure. To rivet the conductors to the enclosure, however, the insulator must be so shaped that riveting tools can be inserted therethrough so as to reach the rivets at opposite ends thereof. It is therefore necessary to form access holes in the insulator which extend from the outer surface thereof to the area where the conductors are to be joined to the enclosure.

The insulator mounted between the carburetor and the intake manifold has an air-fuel mixture passage defined therethrough to deliver the air-fuel mixture from the carburetor via the insulator to the intake manifold. The air-fuel mixture passage in the insulator is sealed by seal members disposed between the insulator and the carburetor and also between the insulator and the intake manifold. The seal member between the insulator and the intake manifold is usually a gasket, and the seal member between the insulator and the carburetor normally comprises an O-ring which is effective in absorbing vibration which would otherwise be transmitted from the insulator to the carburetor. As a consequence, there is a small gap provided between the carburetor and the insulator for accommodating the O-ring therein.

The O-ring is located in a position as close to the air-fuel mixture passage as possible. If the O-ring were spaced excessively away from the air-fuel mixture passage, fuel would tend to be attracted from the air fuel mixture passage into the gap between the carburetor and the insulator due to capillary action, thereby changing the density of the air-fuel mixture supplied to the combustion chambers of the engine. To avoid this drawback, the access holes in the insulator which open toward the carburetor are positioned outwardly of the O-ring. The access holes thus positioned however cause another problem in that ambient air introduced into the gap between the carburetor and the insulator is apt to find its way into the air-fuel passage through the access holes and gaps that may be present in the rivet-joined portions of the conductors and the enclosure.

When the engine is stopped right after it has been run under high load conditions, the engine is of a high temperature, and the air intake system is filled with vaporized fuel which is likely to leak out through the gaps in the rivet-joined portions and the access holes. If water is trapped in the gap between the carburetor and the insulator, then it tends to be attached to the rivet-joined portions in the same manner as described above, thus corroding the rivet-joined portions.

The conductors embedded in the insulator are relatively short with the terminals thereof projecting from the insulator near the PTC heater. In the event that the insulator has two air-fuel passages connected respectively to the primary and secondary passages of a double-barrel carburetor, the terminals of the conductors are positioned on the side of the primary passage with which the PTC heater is associated.

While the PTC heater is in operation, its temperature reaches about 200° C., for example. The heat of the PTC heater is transmitted to the terminals through the conductors joined to the PTC heater. Where the conductors are relatively short, their terminals are also heated up to a considerably high temperature, and so are the leads coupled to the terminals. Therefore, the leads are required to be resistant to heat. The coupled ends of the terminals and the leads are covered with water-resistant covers, which are also required to be heat-resistant. The terminals and the leads should not be joined together by such joining means of low heat resistance as solder.

Other prior air-fuel mixture heaters are disclosed in U.S. Pat. Nos. 4,108,125; 4,121,543 and 3,987,772.

It is an object of the present invention to provide an air-fuel mixture heating device for engines which includes an insulator having access holes to allow tools to easily join conductors in an insulator and an electric heater such as a PTC heater, and which also includes means for preventing ambient air and water from entering the heating device through the access holes and also for preventing fuel from leaking out of the heating device through the access holes.

Another object of the present invention is to provide an air-fuel mixture heating device for engines which includes conductors connected to an electric heater such as a PTC heater attached to an insulator, and terminals connected to the conductors for supplying electric power through the conductors to the electric heater, the conductors and heaters being arranged to reduce heat transmitted from the electric heater to the terminals.

Still another object of the present invention is to provide an air-fuel mixture heating device for engines which includes an insulator reinforced with conductors embedded therein.

According to the present invention, there is provided an air-fuel mixture heating device for use with an engine having a carburetor including an air-fuel passage, an intake manifold, and an electric power supply, the air-fuel mixture heating device comprising an insulator adapted to be mounted between the carburetor and the intake manifold and having an air-fuel mixture passage adapted to communicate with the air-fuel mixture passage in the carburetor for delivering an air-fuel mixture from the carburetor therethrough into the intake manifold, an electric heater disposed in the insulator across the air-fuel mixture passage therein for heating the air-fuel mixture delivered through the air-fuel mixture passage in the insulator, and a plurality of conductors embedded in the insulator and having portions connected to the electric heater, the conductors being adapted to be connected to the electric power supply, the insulator having access holes extending to the portions of the conductors for allowing the portions to be joined to the electric heater therethrough, the access holes being filled up with sealing resin after the portions are joined to the electric heater. The portions of the conductors can easily be joined as by riveting to the electric heater through the access holes, which will thereafter be sealed by the sealing resin to prevent the entry of air and water therethrough into the heating device. Thus, the joined portions are prevented from being corroded.

According to the present invention, there is also provided an air-fuel mixture heating device for use with an engine having a carburetor including primary and secondary air-fuel passages, an intake manifold, and an electric power supply, the air-fuel mixture heating device comprising an insulator adapted to be mounted between the carburetor and the intake manifold and having first and second air-fuel mixture passages adapted to communicate with the primary and secondary air-fuel mixture passages, respectively, in the carburetor for delivering an air-fuel mixture from the carburetor therethrough into the intake manifold, an electric heater disposed in the insulator across the first air-fuel mixture passage for heating the air-fuel mixture delivered through the first air-fuel mixture passage, and a plurality of conductors embedded in the insulator and having one ends connected to the electric heater, the conductors having opposite ends projecting out of a side of the insulator close to the second air-fuel mixture passage therein as terminals which are adapted to be connected to the electric power supply. The conductors extending on one side of the second air-fuel mixture passage are long enough to dissipate heat transmitted from the electric heater so that the projecting ends or terminals of the conductors are prevented from being heated to a high temperature. The insulator is reinforced by the relatively long conductors embedded therein.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
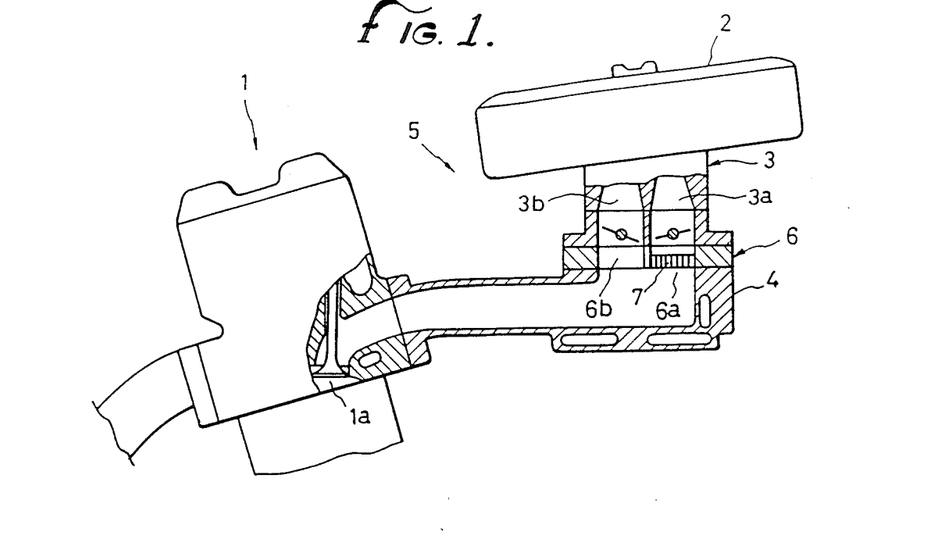
FIG. 1 is a fragmentary schematic side elevational view, partly in cross section, of an engine incorporating an air-fuel mixture heating device according to an embodiment of the present invention.

As shown in FIG. 1, an engine assembly 1 has a combustion chamber 1a supplied with an air-fuel mixture from an intake system 5 comprising an air cleaner 2, a carburetor 3, and an intake manifold 4. The carburetor 3 is of the double-barrel type composed of a primary passage 3a which will be open when the engine operates under low and high loads and a secondary passage 3b which will be open only when the engine runs in a high load range.

An air-fuel mixture heating device according to the present invention includes a flat insulator 6 interposed between the carburetor 3 and the intake manifold 4 for preventing the heat generated by the engine assembly 1 during operation thereof from being transmitted through the intake manifold 4 to the carburetor 3 to avoid undue heating of the fuel in the carburetor 3 and the passages 3a, 3b. The insulator 6 is made of a heat-resistant, electrically insulative hard resin such as Bakelite (trademark) or phenolic resins. The insulator 6 has first and second air-fuel mixture passages 6a, 6b opening into the carburetor 3 and the intake manifold 4 and communicating respectively with the primary and secondary passages 3a, 3b of the carburetor 3. The air-fuel mixture heating device has a PTC heater 7 disposed in the first air-fuel mixture passage 6a.

Figure 2:
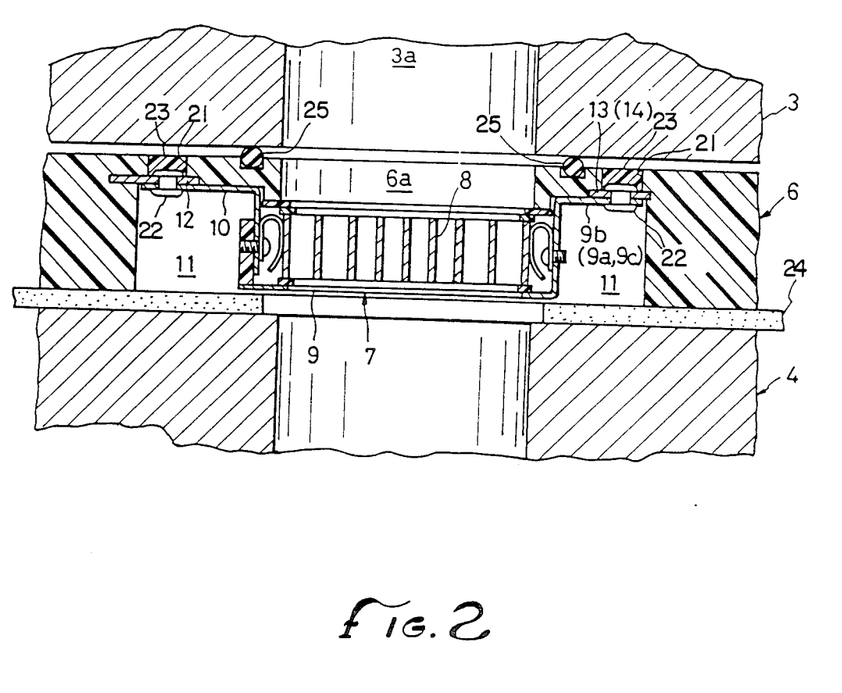
FIG. 2 is an enlarged vertical cross-sectional view of the air-fuel mixture heating device mounted between a carburetor and an intake manifold.
Figure 3:
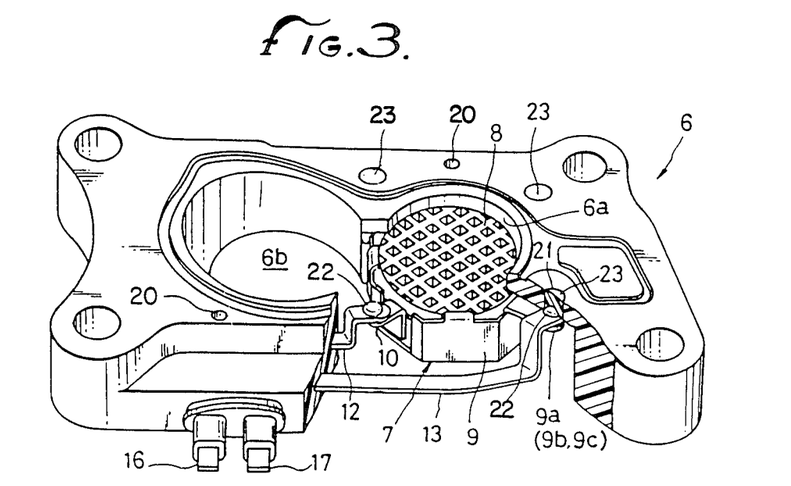
FIG. 3 is a perspective view, partly cut away, of the air-fuel mixture heating device shown in FIG. 2.
Figure 4:
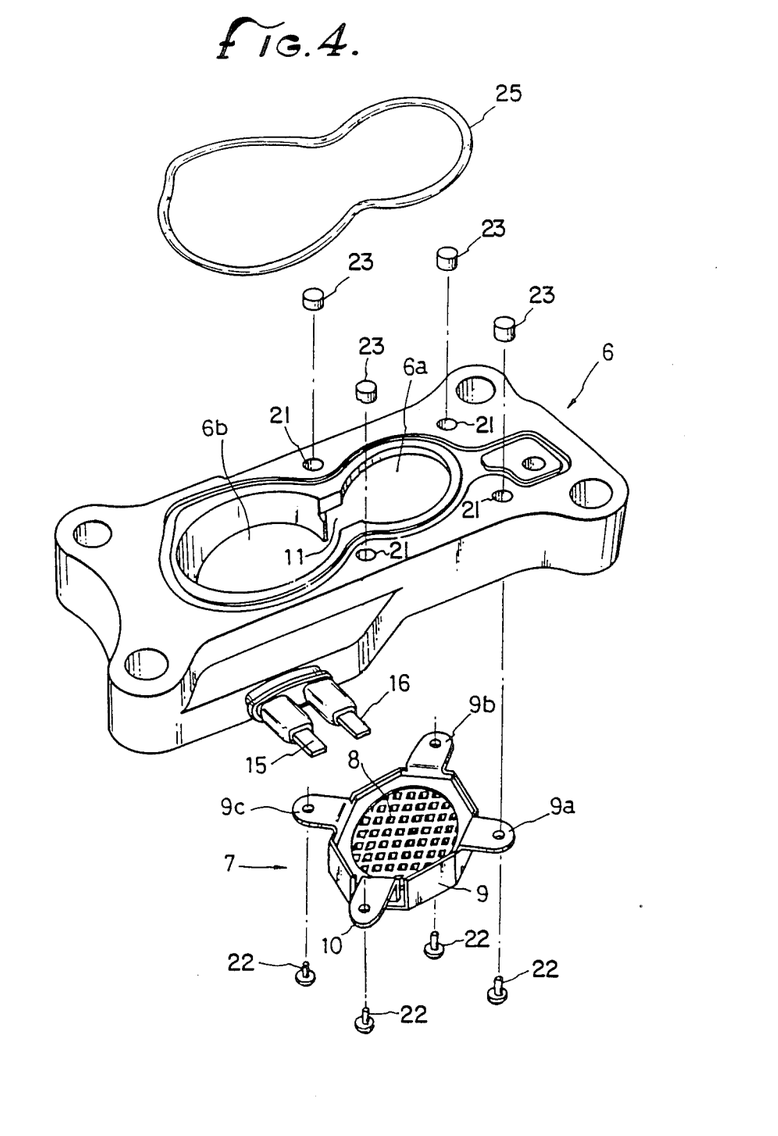
FIG. 4 is an exploded perspective view of the air-fuel mixture heating device shown in FIG. 3.

As illustrated in FIGS. 2 through 4, the PTC heater 7 has a honeycomb structure 8 made of a ceramic resistor material having a positive temperature coefficient of resistivity. The honeycomb structure 8 has a plurality of passages defined therethrough in spaced side-by-side relationship by parallel partitions and is housed in a metal enclosure 9 of a polygonal shape. The PTC heater 7 will be heated by application of a voltage to the outer partitions of the honeycomb structure 8. The enclosure 9 has three integral legs 9a, 9b, 9c, and another leg 10 is fixed to the PTC heater 7 in electrically insulated relation to the enclosure 9. These legs 9a, 9b, 9c, 10 are angularly spaced at substantially equal angular intervals. As shown in FIG. 2, one side wall of the honeycomb structure 8 of the PTC heater 7 is electrically connected to the enclosure 9, whereas the opposite side wall of the honeycomb structure 8 is electrically connected to the leg 10.

As shown in FIGS. 2 and 4, the insulator 6 has a recess 11 defined in a lower surface thereof which faces the intake manifold 4 and includes the passage 6a therein. The PTC heater 7 as housed in the enclosure 9 is placed in the recess 11. Three conductors 12, 13, 14 (FIG. 5) in the form of thin metal webs are embedded in the insulator 6. The conductors 12, 13 extend along side each other in spaced relationship in the insulator 6 from one side of the first passage 6a to one side of the second passage 6b. The conductors 12, 13 have outer ends projecting from one side of the insulator 6 and serving as terminals 15, 16, respectively. To these terminals 15, 16, there are spot-welded the exposed ends of insulation-covered leads 17, 17, respectively, connected by a connector 18 to an external power supply such as a battery on the automobile on which the engine assembly 1 is mounted. The joined ends of the terminals 15, 16 and the leads 17, 17 are covered with a water-resistant cover 19.

Figure 5:
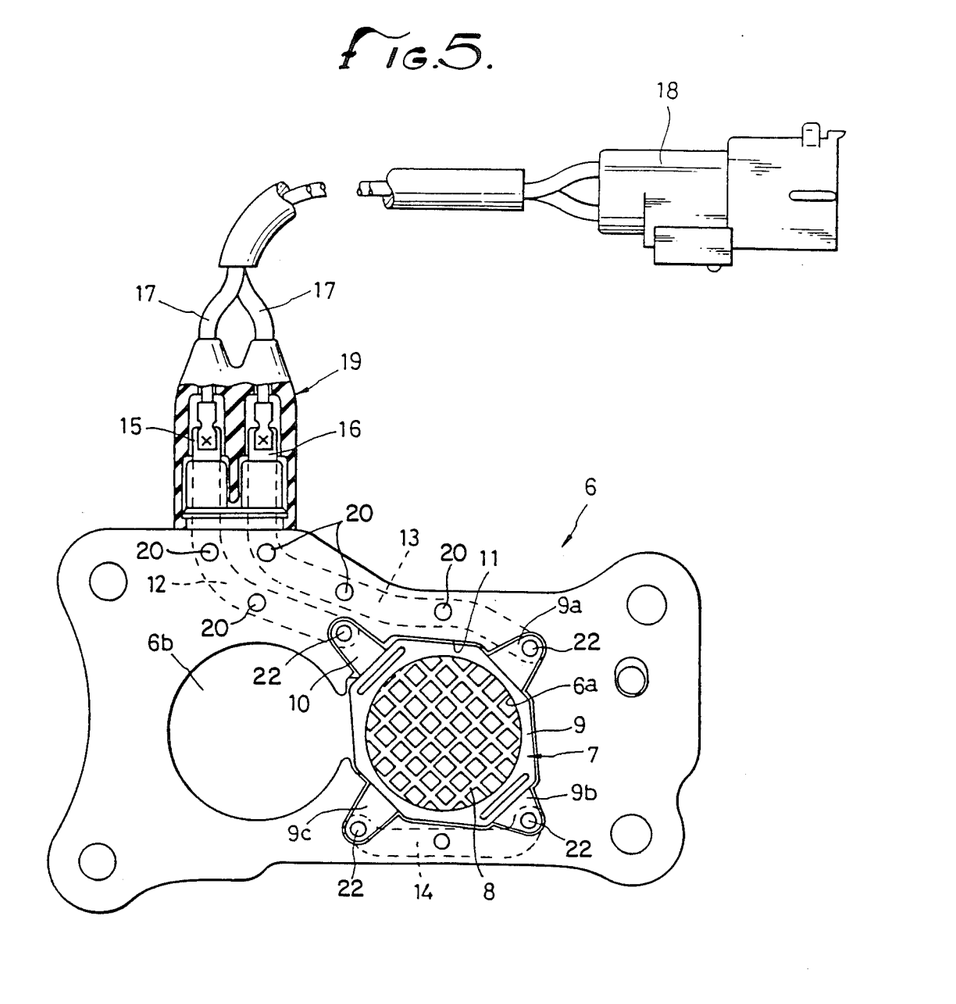
FIG. 5 is a bottom view of the air-fuel mixture heating device with a connector coupled thereto.

The inner ends of the conductors 12, 13 are exposed in the recess 11 at positions corresponding to the legs 10, 9a, respectively, of the PTC heater 7. The other conductor 14 is positioned on the opposite side of the first passage 6a and has opposite ends exposed in the recess 11 at positions corresponding to the legs 9b, 9c, respectively. When the PTC heater 7 is placed in the recess 11, therefore, the legs 10, 9a, 9b, 9c can be electrically connected to the conductors 12, 13, 14.

The insulator 6 can be molded in a mold (not shown). The conductors 12, 13, 14 can be embedded in the insulator 6 by placing them in position in the mold and pouring a liquid mass of insulator material into the mold. The molded insulator 6 has a plurality of apertures 20 through which the conductors 12, 13, 14 are supported by suitable members in the mold during molding of the insulator 6, and the apertures 20 extend from the upper and lower surfaces of the insulator 6 to the conductors 12, 13, 14.

As shown in FIGS. 2, 3, and 4, the insulator 6 has four access holes 21 defined in an upper surface thereof at positions corresponding to the ends of the conductors 12, 13, 14. The access holes 21 extend from the upper surface of the insulator 6 to the conductors 12, 13, 14 as best shown in FIG. 2. Therefore, the ends of the conductors 12, 13, 14 are exposed at the upper and lower surfaces of the insulator 6.

For attaching the PTC heater 7 to the insulator 6, the PTC heater 7 is put into the recess 11 from the lower surface of the insulator 6 so that the legs 10, 9a, 9b, 9c are positioned respectively on the ends of the conductors 12, 13, 14. The legs 10, 9a, 9b, 9c are of different shapes as shown in FIG. 5 to assure that they will be positioned properly in the recess 11. Then, rivets 22 are inserted from the recess 11 into the overlapped portions of the legs 10, 9a, 9b, 9c and the ends of the conductors 12, 13, 14, and the protruding ends of the rivets 22 are pressed and properly deformed by tools inserted in the access holes 21 to connect the legs to the conductors. The PTC heater 7 is now fixed in place to the insulator 6 and electrically connected to the conductors 12, 13, 14.

After the legs 10, 9a, 9b, 9c of the PTC heater 7 have been secured to the conductors 12, 13, 14, the access holes 21 are filled up with masses 23 of sealing epoxy resin, which will solidify in sealing relation to the access holes 21. The apertures 20 that were formed in the insulator 6 during molding by members supporting the conductors 12, 13 are left unfilled for reasons that will be explained below.

The insulator 6 to which the PTC heater 7 is attached is placed on the intake manifold 4 with a gasket 24 interposed therebetween, as shown in FIG. 2. Then, the carburetor 3 is mounted on the insulator 6 with an O-ring 25 interposed therebetween which surrounds the air-fuel passages 6a, 6b closely thereto as best illustrated in FIG. 4. The insulator 6 is thereafter securely fastened in place between the carburetor 3 and the intake manifold 4 by tightening bolts (not shown) interconnecting the carburetor 3 and the intake manifold 4. The terminals 15, 16 are then connected to the battery by the leads 17, 17 and the connector 18.

When the engine is started under cold condition, an air-fuel mixture is supplied from the primary passage 3a of the carburetor 3 via the first air-fuel passage 6a of the insulator 6 into the intake manifold 4. At the same time, an electric current is also supplied from the battery through the leads 17, 17 to the PTC heater 7. Electric power is therefore supplied to one side wall of the honeycomb structure 8 through the terminal 15, the conductor 12, and the leg 10, and also to the opposite side wall of the honeycomb structure 8 through the terminal 16, the conductor 13, the leg 9a, and the enclosure 9. The partitions of the honeycomb structure 8 are then heated by the voltage applied thereto. Accordingly, the air-fuel mixture passing through the first air-intake passage 6a is heated by the PTC heater 7 to evaporate fuel droplets contained in the air-fuel mixture. When the temperature of the engine assembly 1 reaches a predetermined temperature, the PTC heater 7 is de-energized by a suitable control circuit (not shown).

While the engine is running, a vacuum is developed in the first and second air-fuel passages 6a, 6b of the insulator 6. Since the air-fuel passages 6a, 6b are sealed by the gasket 24 and the O-ring 25, ambient air and water are prevented from entering the PTC heater through gaps between the insulator 6 and the carburetor 3 and between the insulator 6 and the intake manifold 4. The access holes 21 which are positioned outwardly of the O-ring 25 are sealed by the sealing resin bodies 23 filling the access holes 2. Ambient air and water are also prevented from entering the passages 6a, 6b through the access holes 21 from outside the carburetor 3 and intake manifold 4 whereby no leakage problem arises from the floating support of the carburetor 3 on the insulator 6 through the O-ring 25.

When the engine is stopped right after it has been run under high load condition, the engine assembly 1 is of a high temperature and a positive pressure may be established in the air-fuel passages 6a, 6b due to vaporized fuel therein. However, even if this happens, such vaporized fuel is prevented by the O-ring 25 from leaking out of the gap between the carburetor 3 and the insulator 6.

With the arrangement of the heating device thus constructed, therefore, the PTC heater 7 can easily be attached to the insulator 6, and the air-fuel passages 6a, 6b of the insulator 6 are well sealed as required.

During operation of the PTC heater 7, the heat generated by the honeycomb structure 8 is transmitted through the legs 10, 9a, the riveted joints, and the conductors 12, 13 to the terminals 15, 16. Inasmuch as the conductors 12, 13 are relatively long, however, a considerable amount of heat may be absorbed from the conductors 12, 13 by the insulator 6. A certain amount of heat is also radiated from the conductors 12, 13 through the open holes 20 in the top of the insulator 6 and also through the gap between the carburetor 3 and the insulator 6. Thus, the amount of remaining heat transmitted to the terminals 15, 16 is relatively small, and the terminals 15, 16 are prevented from being heated excessively.

The metal-web conductors 12, 13 embedded in the insulator 6 and extending from one side of the first air-fuel passage 6a to one side of the second air-fuel passage 6b serve to reinforce the insulator 6. The conductor 14 is also effective to a certain extent in reinforcing the insulator 6, but would be more effective in doing so by being extended to a position on the opposite side of the second passage 6b.

The legs 9b, 9c of the enclosure 9 may not necessarily be interconnected by the conductor 14 since the conductor 14 is embedded primarily for the purpose of reinforcing the insulator 6. These legs 9b, 9c may be dispensed with if the PTC heater 7 is well anchored firmly to the insulator 6 only by the legs 10, 9a.

The conductors 12, 13 may be of increased length for greater reinforcement of the insulator 6. In such a modification, the PTC heater 7 will be joined to the conductors 12, 13 at their intermediate portions.

As a further modification, instead of the PTC heater 7, another form of electric heater may be attached to the insulator 6, and may be joined to the conductors 12, 13, 14 by spot welding rather than riveting.

Figure 6:
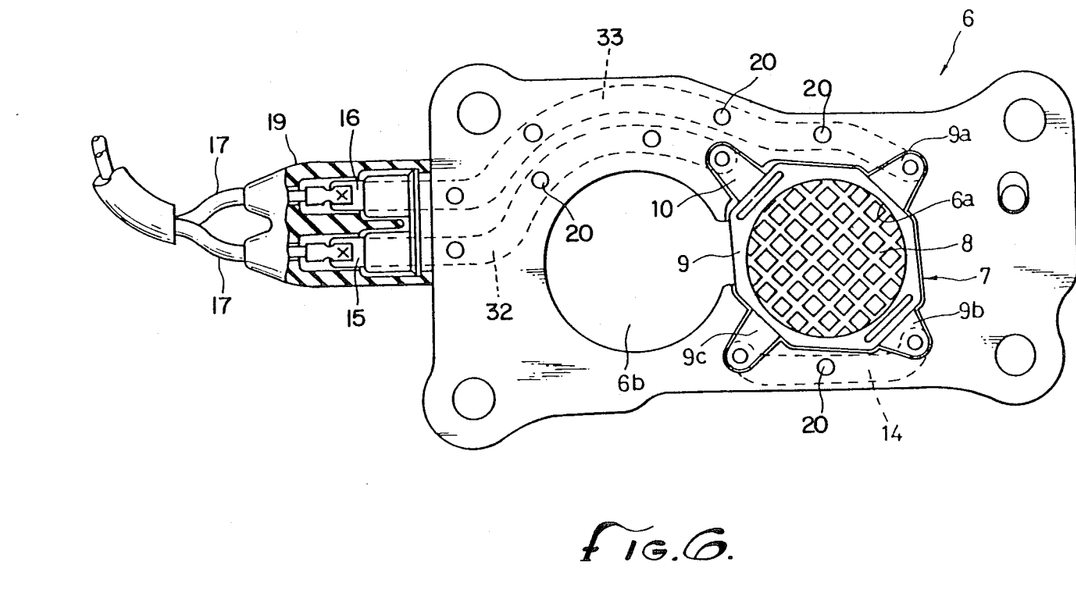
FIG. 6 is a bottom view of an air-fuel mixture heating device according to another embodiment of the present invention.

FIG. 6 shows an air-fuel mixture heating device according to another embodiment of the present invention. Those parts shown in FIG. 6 which are identical to those of FIGS. 2 through 5 are denoted by identical reference characters. In this embodiment, two conductors 32, 33 embedded in the insulator 6 extend in partly surrounding relation to the second passage 6b and have end terminals 15, 16 projecting from a side of the insulator 6 which is remote from the first passage 6a. Since the conductors 32, 33 thus arranged are of an increased length, more heat can be dissipated therefrom by the insulator 6 and holes 20 thereby to reduce the temperature rise of the terminals 15, 16 and also the insulator 6 is more reinforced.

In summary, according to the present invention, the PTC heater 7 is mechanically attached to the insulator 6 and electrically connected to the conductors 12, 13, 14 (or 32, 33, 14) at the same time simply by fixing the PTC heater 7 to the conductors. The insulator 6 is reinforced by the conductors 12, 13, 14 (or 32, 33, 14) embedded therein. The access holes 21 defined in the insulator 6 allow easy connection as by riveting of the conductors 12, 13, 14 (or 32, 33, 14) and the legs 10, 9a, 9b, 9c of the PTC heater 7. The riveted joints between the conductors and the legs are resistant to heat and mechanically reliable against separation. The access holes 21 are sealed by the masses 23 of sealing resin to prevent ambient air and water from entering the PTC heater 7 and also to prevent fuel from leaking out of the PTC heater 7. Since the access holes 21 are positioned outwardly an adequate distance, the O-ring 25 may be positioned inside said holes 21 and close to the first and second air-fuel passages 6a, 6b for effectively sealing them.

Futhermore, the conductors 12, 13 extending from one side of the first air-fuel passage 6a to one side of the second air-fuel passage 6b (FIG. 5) or the conductors 32, 33 extending from one side of the first air-fuel passage 6a in partly surrounding relation to the second air-fuel passage 6b (FIG. 6) are relatively long to permit a substantial amount of heat to be dissipated therefrom into the insulator 6. As a consequence, the terminals 15, 16 at the outer ends of the conductors 12, 13 (and 32, 33) are prevented from being unduly heated, and the leads 17, 17 connected to the terminals 15, 16 and the water resistant cover 19 covering the terminals 15, 16 may be of relatively low heat resistance materials and inexpensive.

The relatively long conductors 12, 13 (or 32, 33) embedded in the insulator 6 are effective in sufficiently reinforcing the insulator 6, which remains mechanically strong and durable even with the air-fuel passaages 6a, 6b of large diameter described herein.

Although certain preferred embodiments have been shown and described, it should be understood that many changes and modifications may be made therein without departing from the scope of the appended claims.

What is claimed:

1. An air-fuel mixture heating device for use with an engine having a carburetor including an air-fuel passage, an intake manifold, and an electric power supply, said air-fuel mixture heating device comprising:

an insulator adapted to be mounted between the carburetor and the intake manifold and having an air-fuel mixture passage adapted to communicate with said air-fuel mixture passage in the carburetor for delivering an air-fuel mixture from the carburetor therethrough into the intake manifold;

an electric heater disposed in said insulator across said air-fuel mixture passage therein for heating the air-fuel mixture delivered through said air-fuel mixture passage in the insulator;

a plurality of conductors embedded in said insulator and having portions connected to said electric heater, said conductors being adapted to be connected to the electric power supply;

said insulator having access holes extending to said portions of the conductors for allowing said portions to be joined to said eletric heater therethrough, said access holes being filled up with masses of sealing resin after said portions are joined to said electric heater; and an O-ring positioned on one surface of said insulator and extending around said air-fuel mixture passage therein inwardly of said access holes, said O-ring being adapted to be disposed between the carburetor and said insulator.

2. An air-fuel mixture heating device for use with an engine having a carburetor including primary and secondary air-fuel passages, an intake manifold, and an electric power supply, said air-fuel mixture heating device comprising:

an insulator adapted to be mounted between the carburetor and the intake manifold and having first and second air-fuel mixture passages adapted to communicate with said primary and secondary air-fuel mixture passages, respectively, in the carburetor for delivering an air-fuel mixture from the carburetor therethrough into the intake manifold;

an electric heater disposed in said insulator across said first air-fuel mixture passage for heating the air-fuel mixture delivered through said first air-fuel mixture passage;

a plurality of conductors embedded in said insulator and each having a first end connected to said electric heater, said conductors each having a second end projecting out of a side of said insulator close to said second air-fuel mixture passage therein as terminals for connecting to the electric power supply;

said insulator provided with a plurality of access holes extending to said first ends of the conductors for allowing said first ends to be joined to said electric heater therethrough, said access holes being filled up with masses of sealing resin after said first ends are joined to said electric heater; and an O-ring positioned on one surface of said insulator and extending around first and second air-fuel mixture passages therein inwardly of said plurality of access holes for connecting said first ends of said conductors to said electric heater, said O-ring being disposed between the carburetor and said insulator.

3. An air-fuel mixture heating device according to claim 1, wherein said conductors extend on one side of said second air-fuel mixture passage with said second ends projecting out of a side of said insulator laterally of said second air-fuel mixture passsage.

4. An air-fuel mixture heating device according to claim 1, wherein said conductors extend in partly surrounding relation to said second air-fuel mixture passage with said second ends projecting out of a side of said insulator remote from said first air-fuel mixture passage.

5. An air-fuel mixture heating device according to claim 1, wherein said insulator has a recess in a surface thereof which is adapted to face the intake manifold and includes said first air-fuel mixture passage in the insulator, said electric heater being positioned in said recess.

6. An air-fuel mixture heating device according to claim 5, wherein said electric heater comprises an enclosure of metal disposed in said recess and a honeycomb structure of a ceramic resistor material having a positive coefficient temperature of resistivity and housed in said enclosure, said enclosure being connected to said conductors.

7. An air-fuel mixture heating device according to claim 6, wherein said first ends of said conductors are exposed in said recess, said enclosure having a plurality of legs connected to said first ends.

8. An air-fuel mixture heating device according to claim 7, wherein said first ends of the conductors and said legs of the enclosure are joined by riveting.

9. An air-fuel mixture heating device according to claim 1, wherein said insulator has a recess in a surface thereof which is adapted to face the intake manifold and includes said air-fuel mixture passage in the insulator, said electric heater being positioned in said recess.

10. An air-ruel mixture heating device according to claim 9, wherein said electric heater comprises an enclosure of metal disposed in said recess and a honeycomb structure of a ceramic resistor material having a positive coefficient temperature of resistivity and housed in said enclosure, said enclosure being connected to said conductors.

11. An air-fuel mixture heating device according to claim 10, wherein said portions of said conductors have ends exposed in said recess, said enclosure having a plurality of legs connected to said ends of the conductors.

12. An air-fuel mixture heating device according to claim 11, wherein said ends of the conductors and said legs of the enclosure are joined by riveting.

13. An air-fuel mixture heating device according to claim 2, wherein said conductors extend on one side of said second air-fuel mixture passage with said second ends projecting out of a side of said insulator laterally of said second air-fuel mixture passage.

14. An air-fuel mixture heating device according to claim 2, wherein said conductors extend in partly surrounding relation to said second air-fuel mixture passage with said second ends projecting out of a side of said insulator remote from said first air-fuel mixture passage.

15. An air-fuel mixture heating device according to claim 2, wherein said insulator has a recess in a surface thereof which is adapted to face the intake manifold and includes said first air-fuel mixture passage in the insulator, said electric heater being positioned in said recess.

16. An air-fuel mixture heating device according to claim 15, wherein said electric heater comprises an enclosure of metal disposed in said recess and a honeycomb structure of a ceramic resistor material having a positive coefficient temperature of resistivity and housed in said enclosure, said enclosure being connected to said conductors.

17. An air-fuel mixture heating device according to claim 16, wherein said first ends of said conductors are exposed in said recess, said enclosure having a plurality of legs connected to said first ends.

18. An air-fuel mixture heating device according to claim 17, wherein said first ends of the conductors and said legs of the enclosure are joined by riveting.

* * * * *